United States Patent [19]

Verastegui

[11] Patent Number: 5,518,367
[45] Date of Patent: May 21, 1996

[54] CROSS-WIND-AXIS WIND TURBINE

[76] Inventor: Raul E. Verastegui, Gartenweg 2A, 55583 Bad Münster am Stein, Germany

[21] Appl. No.: 313,392

[22] Filed: Sep. 27, 1994

[30] Foreign Application Priority Data

Oct. 14, 1993 [EP] European Pat. Off. ............... 93116588

[51] Int. Cl.⁶ .................................................... F03D 3/06
[52] U.S. Cl. .......................................... 416/119; 416/131
[58] Field of Search .................................... 416/119, 131, 416/175, 203, 211, DIG. 8

[56] References Cited

U.S. PATENT DOCUMENTS

| 1,076,713 | 10/1913 | Southwick | 416/119 |
| 4,247,253 | 1/1981 | Seki et al. | 416/119 |
| 5,256,034 | 10/1993 | Sultzbaugh | 416/119 |

FOREIGN PATENT DOCUMENTS

| 57082 | 4/1983 | Japan | 416/119 |
| 2000233 | 1/1979 | United Kingdom | 416/119 |

*Primary Examiner*—Edward K. Look
*Assistant Examiner*—James A. Larson
*Attorney, Agent, or Firm*—Evenson, McKeown, Edwards & Lenahan

[57] ABSTRACT

A mechanical device which converts the wind energy into rotational mechanical energy has a cross-wind-axis rotor structure, having multiple, orientable blades around its periphery, mounted parallel to the rotor axis. Each blade is interconnected with an orientable stabilizer mounted on the same rotor radial line as the blade, at a smaller radius, so that during rotation, the blade and the stabilizer are able to pivot simultaneously and essentially parallel to each other, in the course of aligning themselves, into a pitch angle, where the opposing pitching moments created by the aerodynamic lift forces over the blade and the stabilizer, equilibrate each other, and where the aerodynamic lift forces are the optimum to induce the necessary torque to spin up the rotor.

7 Claims, 11 Drawing Sheets

CROSS-WIND-AXIS WIND TURBINE

BACKGROUND AND SUMMARY OF THE INVENTION

The invention concerns a mechanical device which converts the wind energy into rotational mechanical energy; consisting of a cross-wind-axis rotor structure, having multiple orientable aerodynamic surfaces or blades around its periphery, mounted parallel to the rotor axis; each of these blades being interconnected with another orientable aerodynamic surface or stabilizer, mounted on the same radial line as the blade, at a smaller radius and parallel to the blade, so that, as the rotor revolves by the action of the wind, said blade and said stabilizer are able to pivot simultaneously and essentially parallel to each other around their respective pivot axes, in the course of aligning themselves, into a pitch angle, where the opposing pitching moments created by the aerodynamic lift forces over said blade and said stabilizer, equilibrate each other, and where the aerodynamic lift forces are the optimum to induce the necessary torque to spin up the rotor.

Cross-wind-axis wind turbines with orientable blades, are predicted to have power coefficients greater than for any other wind turbine exceeding the theoretical maximum of 0.593 of propeller type wind-axis wind turbines, due to the fact, that the rotor projected area into the wind is crossed two times by each blade during one revolution, duplicating the effective working area and decelerating a larger portion of the wind than does a propeller type wind-axis wind turbine of the same projected area of rotor disk.

To fully achieve this prediction, the pitch angle of each blade, must be continuously changed during rotation according to the instantaneous peripheral angular position of the blade, to optimize the angle of attack between the chord of the airfoil-shaped cross section of the blade and the changing incidence angle of the relative wind.

Additionally, the amplitude of this angular pitch variation must vary with the celerity or "tip speed ratio" $\lambda$, (which is the relationship between the peripheral tangential speed of the blade $V_{tB}$, divided by the wind speed $V_0$), in order to comply with the amplitude variation of the blade relative wind incidence angle $\Phi B$ with said celerity.

This difficult task is a job worth doing, when the following additional advantages of the cross-wind-axis wind turbines over the propeller type wind turbines are taken into account:

a) Fixed Cross-wind rotor axis:

A cross-wind-axis rotor mounted vertically on top of a tower, eliminates the requirement of aligning the rotor axis with the wind, since it can accept the wind from any direction; this characteristic permits the rotor to extract the energy of a given wind or gust instantaneously regardless of any rapid changes in wind direction.

Considering that the energy available from the wind is proportional to the cube of the velocity, the feature of not having to take time to head the machine into the wind provides additional energy extraction capability over that of a propeller type wind turbine.

This rotor disposition also eliminates the troublesome gyroscopic vibration, which is the consequence, of the natural resistance of any rotating mass against the directional change of its spinning axis.

The expense of the rotor supporting turntable and of the orientation driving mechanism, together with the automatic controls are also saved, and by eliminating these elements, a more integral and reliable unit is achieved.

The vertical drive shaft can be prolonged to ground level, where all the necessary equipment can be easily installed at a more convenient reach for maintenance purposes. The vertical cross-wind-axis rotor also eliminates the problem of ensuring the continuity of the generator electrical cables, from the movable generator to ground level.

b) Straight blades:

It is obvious that a straight blade is easier to calculate and fabricate than a twisted propeller type blade. Being supported usually, at two intermediate points, the straight blade of a cross-wind-axis rotor, is more rigidly supported than a propeller type blade with pivoting capability supported at one end.

A cross-wind-axis wind turbine with orientable blades, is known as Cyclogyro, or Cycloturbine, in which the control of the blade pitch angle is accomplished by means of a central cam mechanism, which must be oriented into the wind.

Because of the fixed geometry of the governing cam, the control of the amplitude of the blade pitch angle variation with the celerity, is not accomplished, therefore the acceleration performance of the Cyclogyro is poor, but even though, a high peak power coefficient of 0.60 is expected; which is not yet the optimum.

The complexity of the orientable central cam mechanism and of the long rods which transmit the movement to the blades, are factors to be considered in the evaluation of this turbine.

Another cross-wind-axis wind turbine with orientable blades, known as Gyromill, has been tested by the McDonell Douglas Aircraft Corporation, in which the control of the blade pitch angle is achieved by means of electronic sensors and servomechanisms. The technical sophistication of this turbine plays against its initial cost and its reliability.

The invention, aims to maximize the great energy production capability of cross-wind-axis wind turbines, by totally matching the pitch angle control of each individual blade, with an extremely simple method, that is to install an additional orientable aerodynamic surface or stabilizer, mechanically linked to each blade, so dimensioned and positioned, that, as the rotor revolves, the aerodynamic lift forces created by the relative wind over the blade and the stabilizer, will produce opposing pitching moments about their respective pivot axis, and as result of their mechanical interconnection, both surfaces will pivot simultaneously and essentially parallel to each other, into an optimum pitch angle, where said opposing pitching moments equilibrate each other.

The pitch angular positioning of each blade and of its respective stabilizer, occurs instantaneously, assuring a perfect coupling and synchronization to the changing direction of the actuating relative wind, at any celerity.

The tangential components of the lift forces created by the relative wind over the blade and the stabilizer, have the same direction, so that, their combined action will induce an added positive torque to spin up the rotor.

The invention expected real peak power coefficient of 0.70, represents a 50% increase in comparison to the real peak power coefficient of a propeller type wind turbine and 16% increase above the peak power coefficient of the Cyclogyro. This advantage added to the mechanical simplicity of the invention, constitutes a real breakthrough, which will make more feasible the wide use of the wind energy.

Further advantages of the invention will become apparent from a consideration of the drawings and ensuing description thereof.

One way of carrying out the invention is described below with reference to drawings which illustrate in detail one specific prefered embodiment. Additional drawings describe in general other suitable embodiments of the invention.

DETAILED DESCRIPTION OF THE DRAWINGS

The preferred embodiment of the invention, shown in multiple views in FIG. 1, FIG. 2, FIG. 3 and FIG. 4, is characterized by having each blade [2] supported at almost equally spaced intermediate points by a rotor structure [1] comprising two radial arms per blade. Following advantages are:

The radial arms, perpendicular to the rotor axis, do not disturb the wind flow through the rotor.

The blades [2], can be made longer allowing a bigger rotor area projected into the wind, and can have a high aspect ratio, which is aerodynamically more efficient.

The stabilizer [3] is better supported at both ends, and aerodynamically benefits from the wing tip end plate effect.

The linkage between the blade and the stabilizer is provided by means of a simple articulated connecting rod [4].

Figure 1:
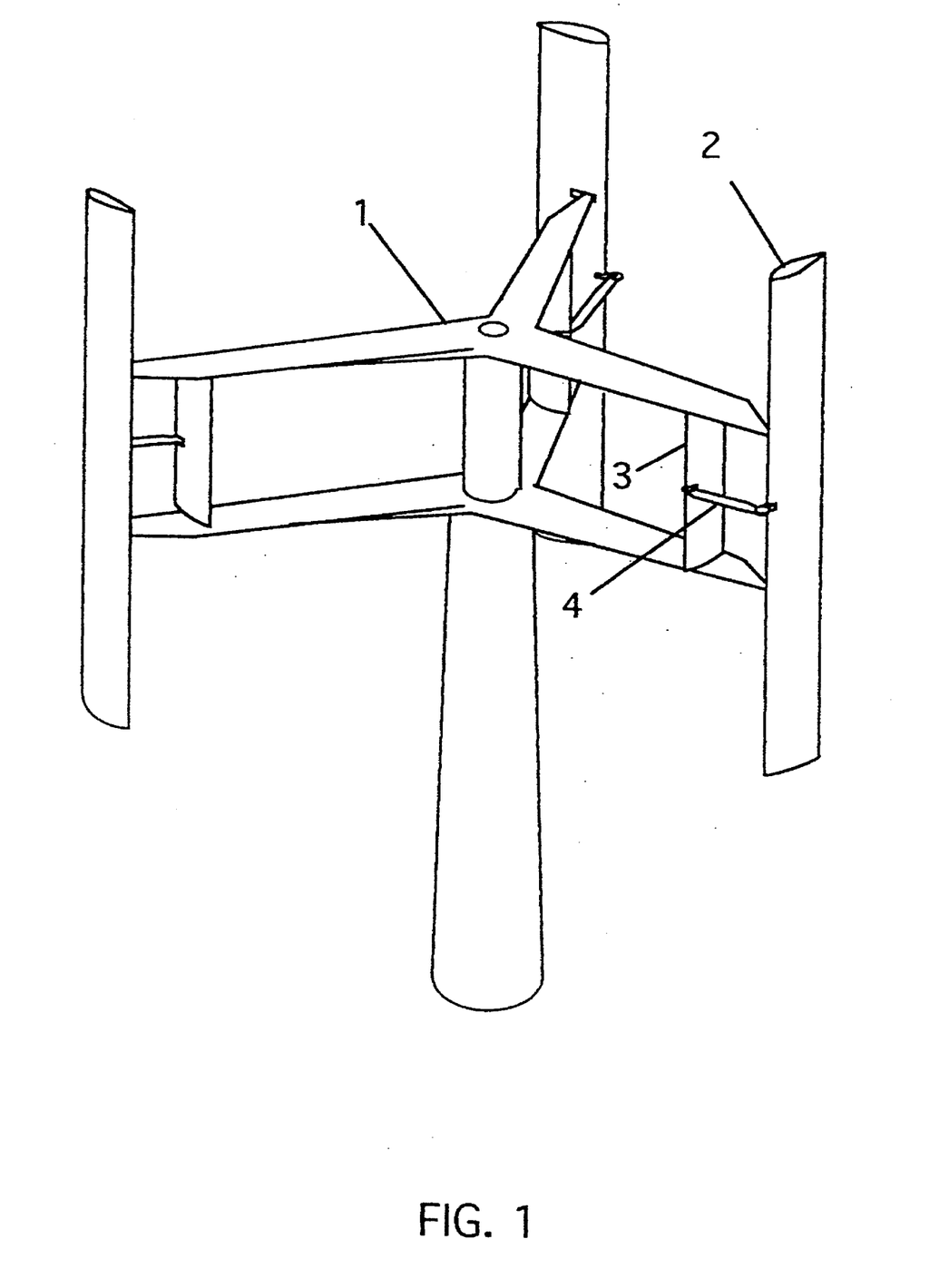
FIG. 1 is a perspective view of the preferred embodiment of the invention.
Figure 2:
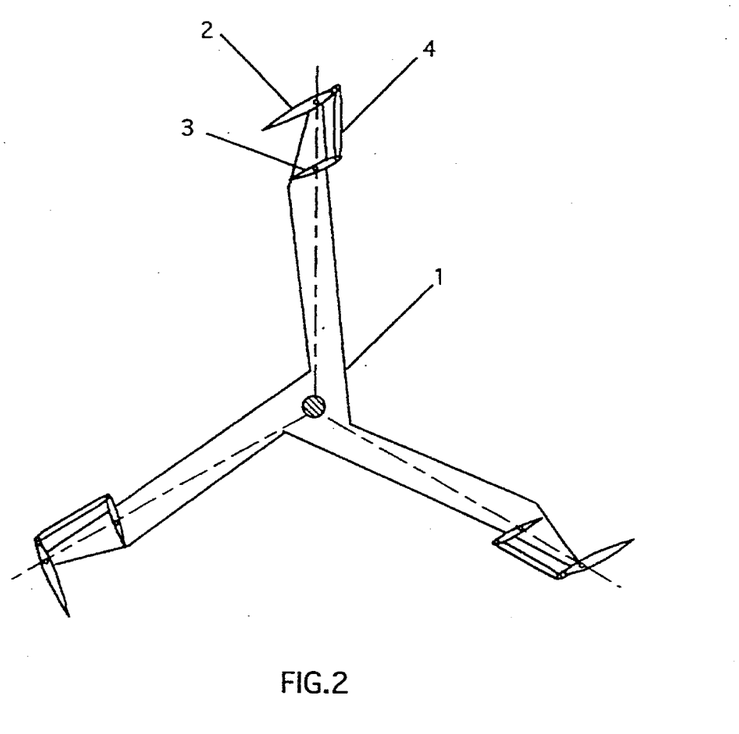
FIG. 2 is a plan view of the preferred embodiment of the invention.
Figure 3:
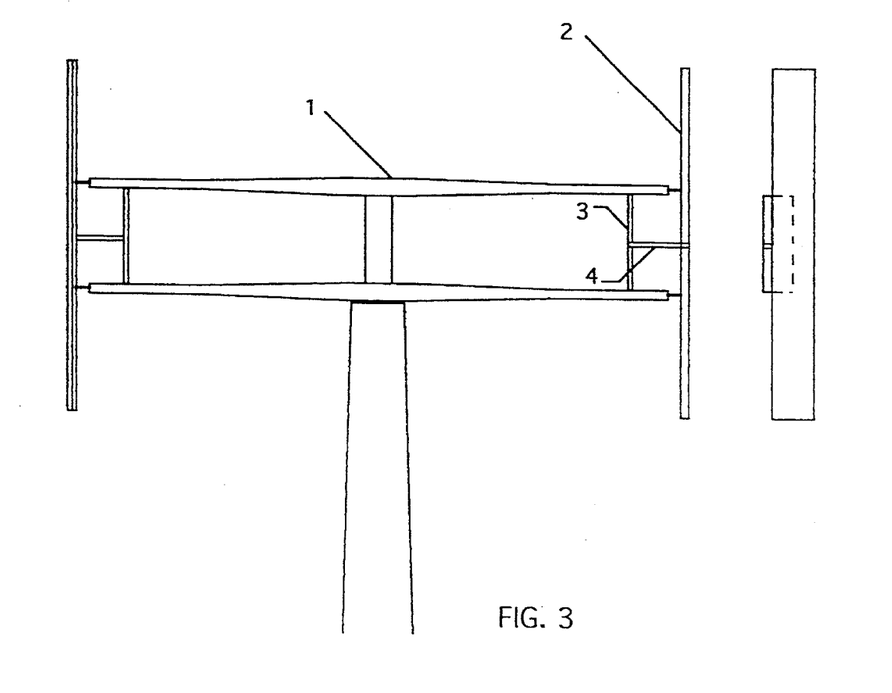
FIG. 3 is a side view of the preferred embodiment of the invention.
Figure 4:
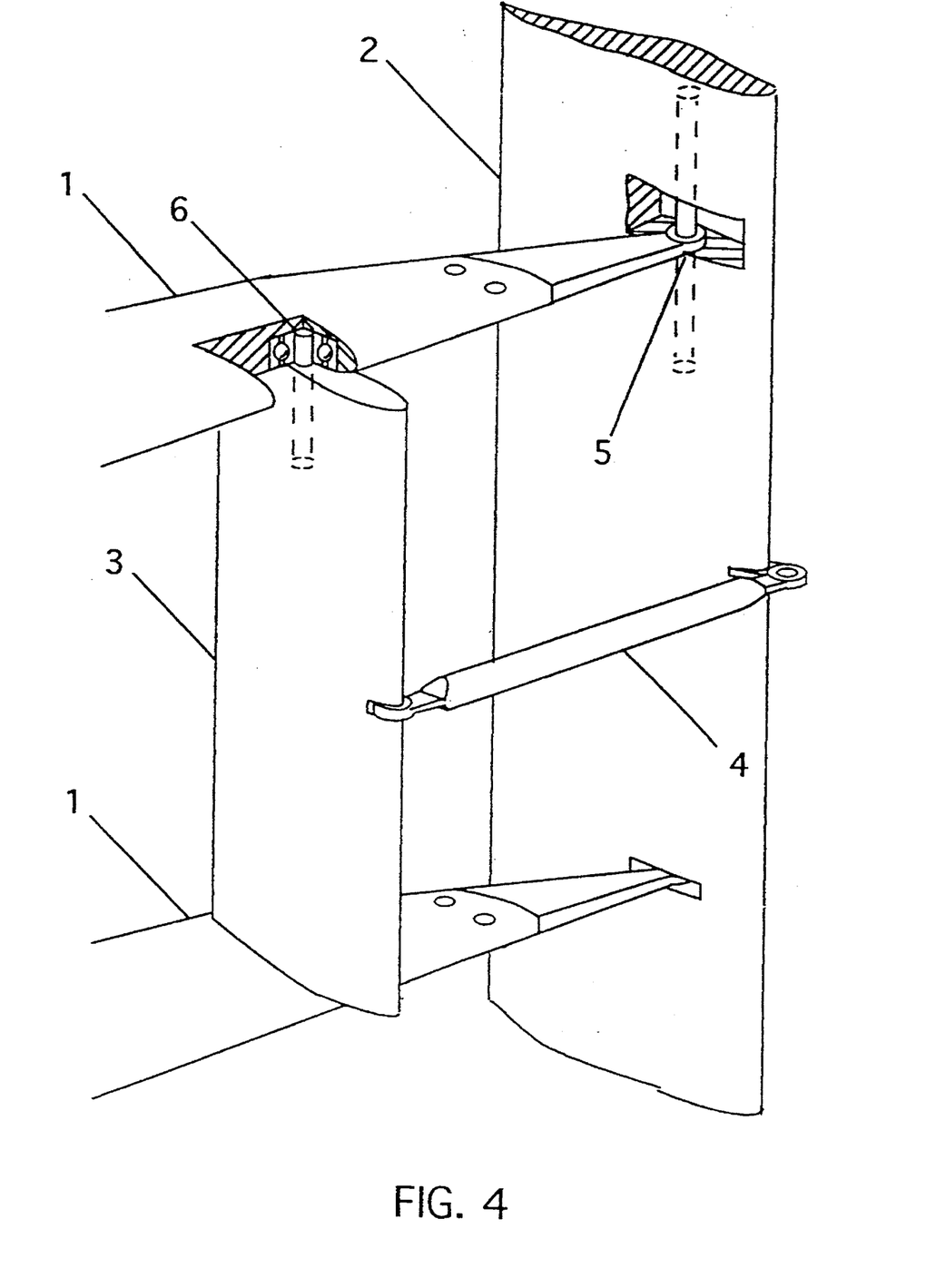
FIG. 4 is a perspective view in detail of FIG. 1, depicting the blade and the stabilizer pivoting assembly.
Figure 5:
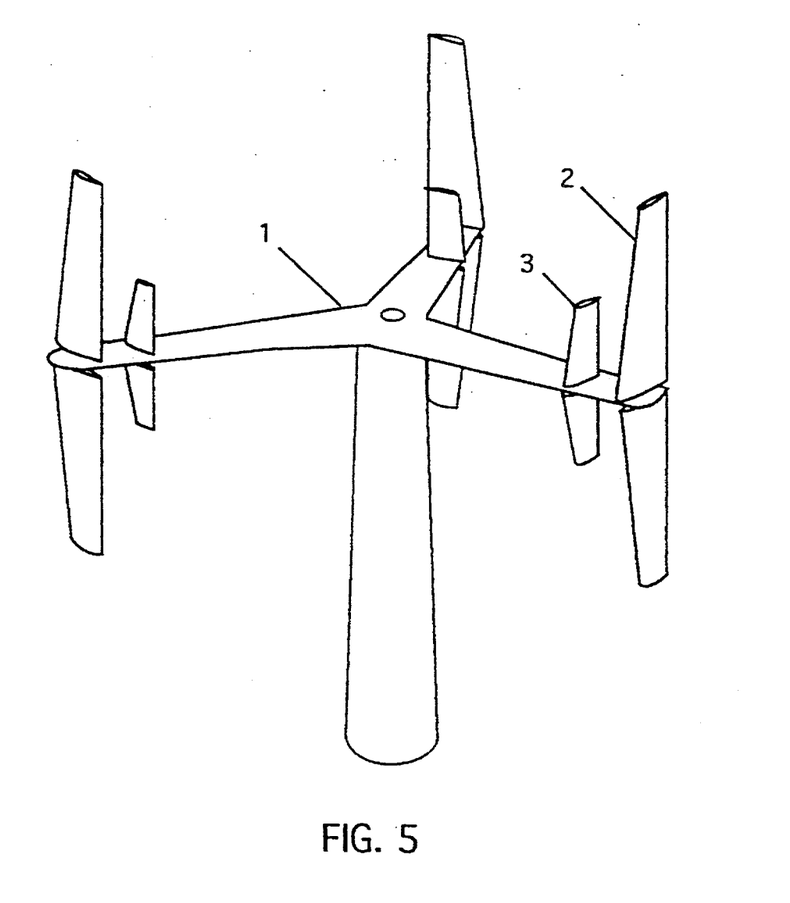
FIG. 5 is a perspective view of another suitable embodiment of the invention.
Figure 7:
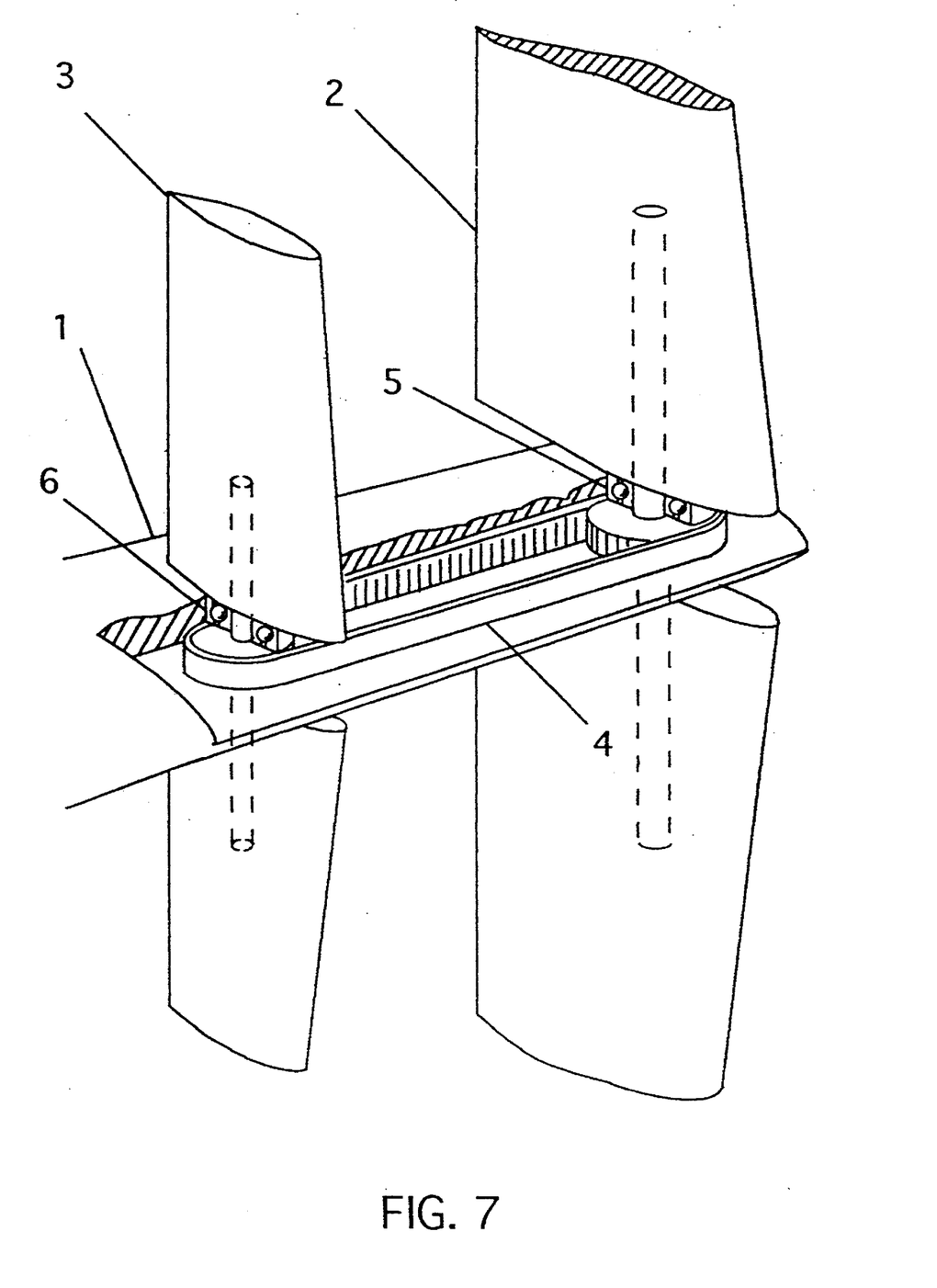
FIG. 7 is a perspective view in detail of FIG. 5, depicting the blade and the stabilizer pivoting assembly.

Another suitable embodiment of the invention, shown in perspective view in FIG. 5, is aimed to reduce the additional cost and weight of the two radial arms per blade and is characterized by having each blade [2] linked to its respective stabilizer [3] by means of a flexible element [4] such as a teethed timing belt or a roller chain, hidden inside the supporting structure [1]. The blades and stabilizers are tapered to improve their strength, and are supported at their pivot shafts in their central partitions. This embodiment does not share the advantages of the preferred embodiment, but due to its clean design, the power coefficient is the same, considering the less drag produced by the single arm rotor structure [1].

Figure 6:
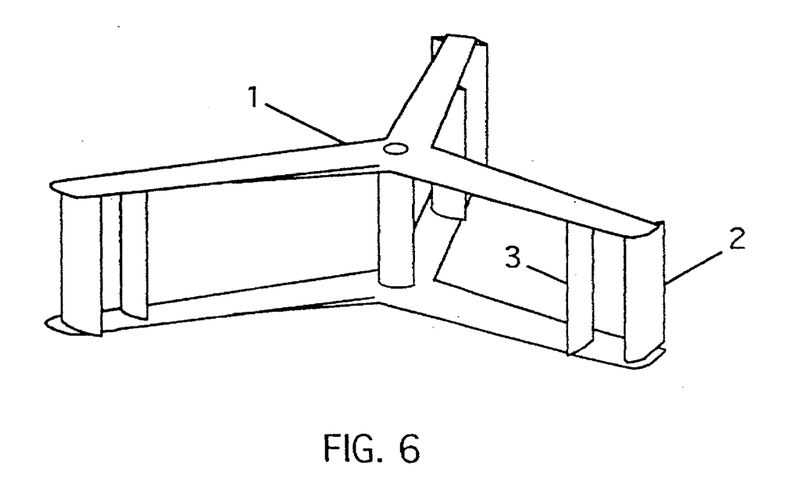
FIG. 6 is a perspective view of different suitable embodiment of the invention.

Another suitable embodiment of the invention, shown in FIG. 6, is characterized by having each blade [2] and each stabilizer [3] the same length, being supported at their outer ends by a double arm rotor structure [1]. Both surfaces are linked by means of a flexible element [4] such as a teethed timing belt or a roller chain, hidden inside the rotor structure [1]. The height of the rotor is comparatively much smaller than the diameter. This embodiment is more suitable to take advantage of very high wind speeds, for example when the rotor is mounted on a vehicle.

Essentially, the invention consists of a cross-wind-axis rotor structure [1], having multiple orientable aerodynamic surfaces or blades [2] around its periphery, mounted parallel to the rotor axis and fastened to the rotor structure [1], by means of pivoting fastening means [5]; being each of said blades [2], interconnected by means of means for transfering angular displacement [4] with another orientable aerodynamic surface or stabilizer [3], mounted on the same rotor radial as the blade, at a radius which is not less than 50% of the rotor radius and fastened to the rotor structure [1], by means of pivoting fastening means [6]; so that during rotation, said blade [2] and said stabilizer [3] are able to pivot simultaneously and essentially parallel to each other around their respective pivot axis.

The blade pivot axis crosses the blade mean aerodynamic chord [CB], at a point between the leading edge and the aerodynamic center of pressure [7], of the airfoil-shaped blade cross section. Shown in FIG. 9.

The stabilizer pivot axis crosses the stabilizer mean aerodynamic chord [CS], at a point between the trailing edge and the aerodynamic center of pressure [8], of the airfoil-shaped stabilizer cross section. Shown in FIG. 9.

The weight distribution of the interconnected assembly comprising the blade [2], the stabilizer [3] and the means for transferring angular displacement [4], is dynamically balanced to avoid an unfavorable displacement due to the centrifugal force.

To explain the theory of operation of the invention, it must be aknowledged in first term, that the-blade lift forces and the resulting swirl in the wake are responsible for blocking the wind. The lift coefficient of the blade CLB, which is a function of the blade angle of attack $\alpha_B$, is a direct expression of this wind blockage, since it must be admitted that if the angle of attack would be zero, the lift coefficient would also be zero and no lift force would be induced on the blade, the wind in consequence would pass undisturbed through the rotor.

Figure 8:
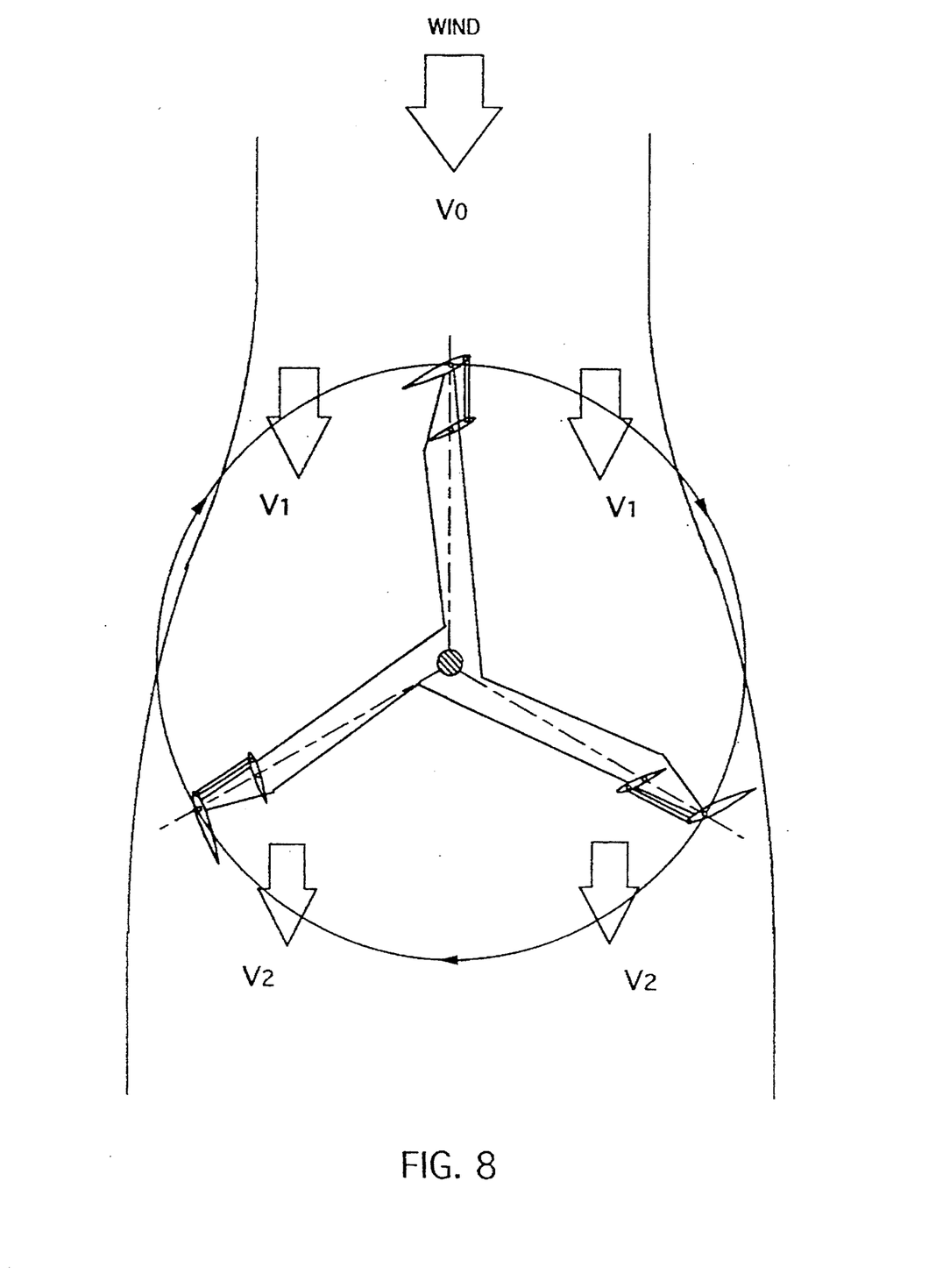
FIG. 8 is a wind flow diagram.

So, it must be assumed that the wind speed V0 is slowed down to V1 when crossing the frontal semicircumference described by the blades and further down to V2 when crossing the rear semicircumference described by the blades. Shown in FIG. 8.

The amount of this speed reduction is defined by the term (1-a), where "a" is the interference factor which depends on the rotor solidity $\sigma$ and on the rotor celerity $\lambda$.

Following expressions can be written:

$V_1$=actual wind between 0°–180°=$V_0$ (1-$a_1$)

$V_2$=actual wind between 180°–360°=$V_0$ (1-$a_2$)

where the interference factor "$a_1$" and "$a_2$" are:

$$a_1 = K_{a1} B (A_B + A_S)/A_R \sin 2\pi \alpha_B \lambda$$

$$a_2 = K_{a2} B (A_B + A_S)/A_R \sin 2\pi \alpha_B \lambda$$

and:

$K_{a1}=a_1$ Correction factor (0°–180°)
$K_{a2}=a_2$ Correction factor (180°–360°)
B=Number of blades
$A_B$=Blade area
$A_S$=Stabilizer area
$A_R$=Rotor projected area across the wind stream
$\alpha_B$=Blade angle of attack
$\lambda$=Celerity or "tip speed ratio" =$V_{tB}/V_0$ To calculate the amount of blockage "$a_1$" and "$a_2$" exerted by the rotor on the wind flow, it must be known first, the blade angle of attack relative to the already reduced wind speeds $V_1$ and $V_2$. The solution cannot be obtained in closed form, and a trial and error technique must be used, starting with the undisturbed wind speed $V_0$.

As mentioned before, and with reference to FIG. 9, the aerodynamic lift forces [LB] and [LS] created by the blade relative wind [VB] and the stabilizer relative wind [VS] over the blade [2] and the stabilizer [3] respectively, will produce opposing pitching moments [MB] and [MS] about their respective pivot axis, and as result of their mechanical interconnection, both surfaces will move parallel to each other around their respective pivot axis, into an optimum equilibrium pitch angle [β]. To greatly simplify the calculation with a high degree of accuracy it has been assumed the location of the pivot axis of the blade and the stabilizer as the points to calculate VB and VS.

Figure 9:
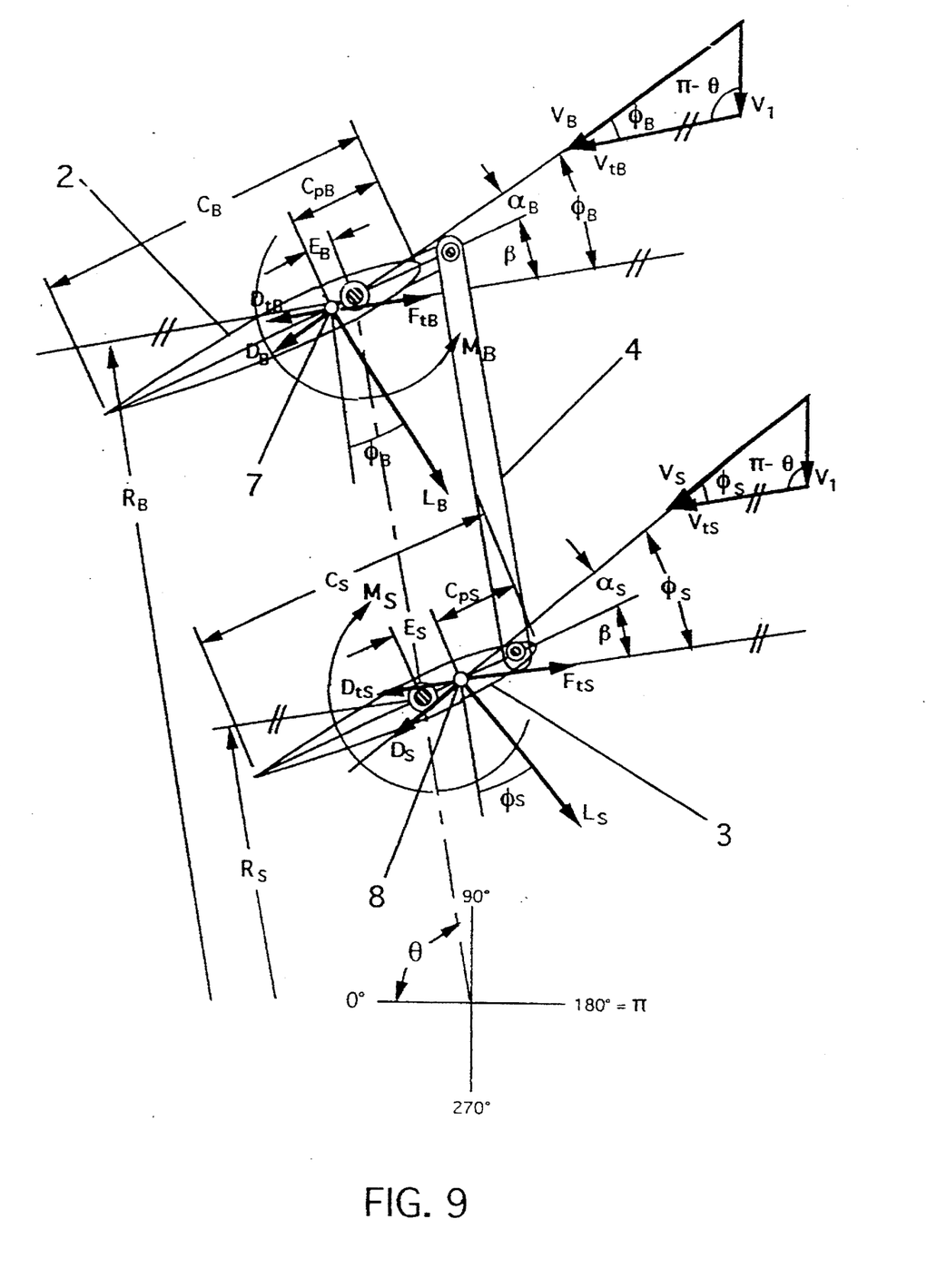
FIG. 9 is a velocities and forces diagram of one blade system.
Figure 10:
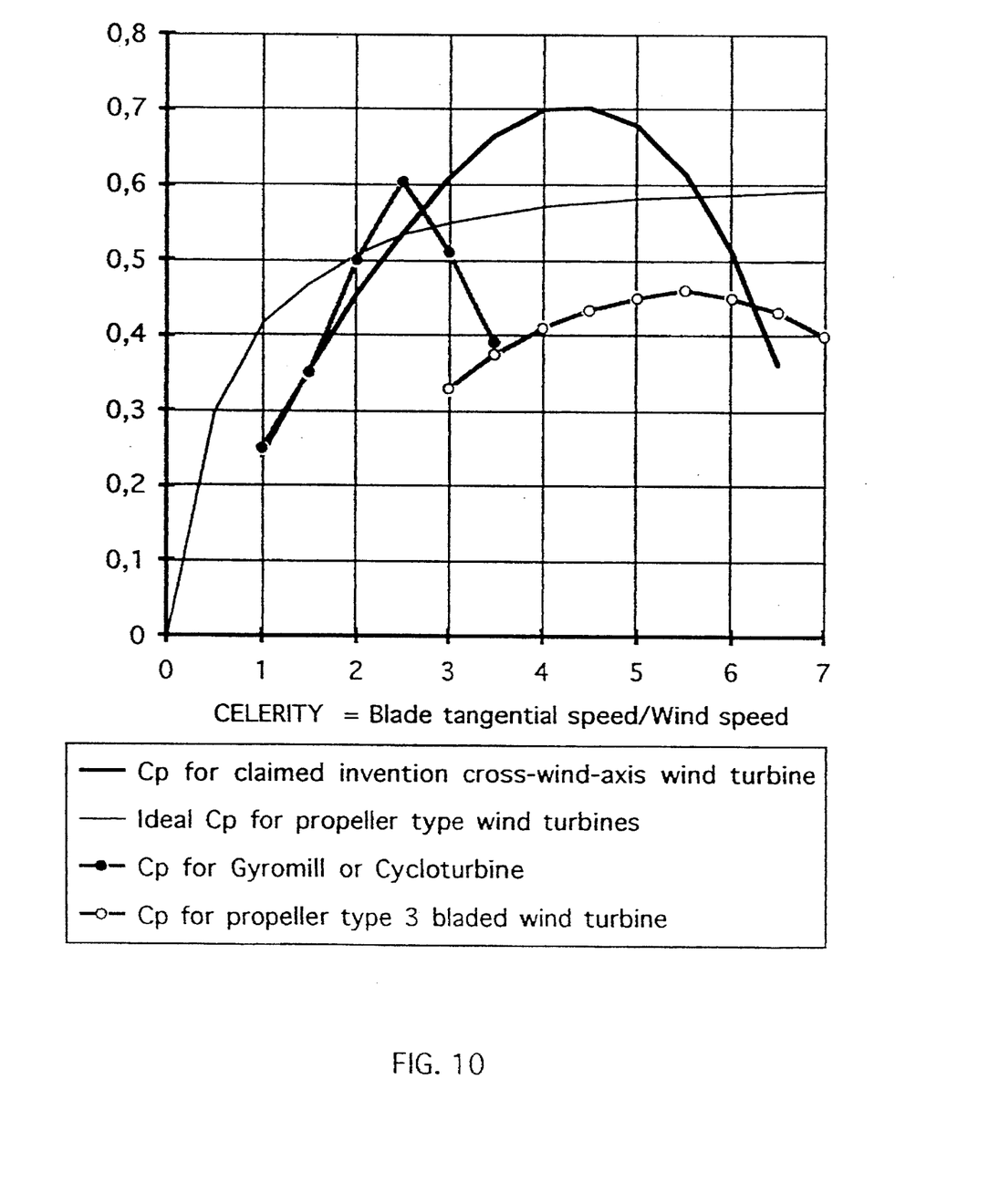
FIG. 10 is a power coefficient versus celerity graph.
Figure 11:
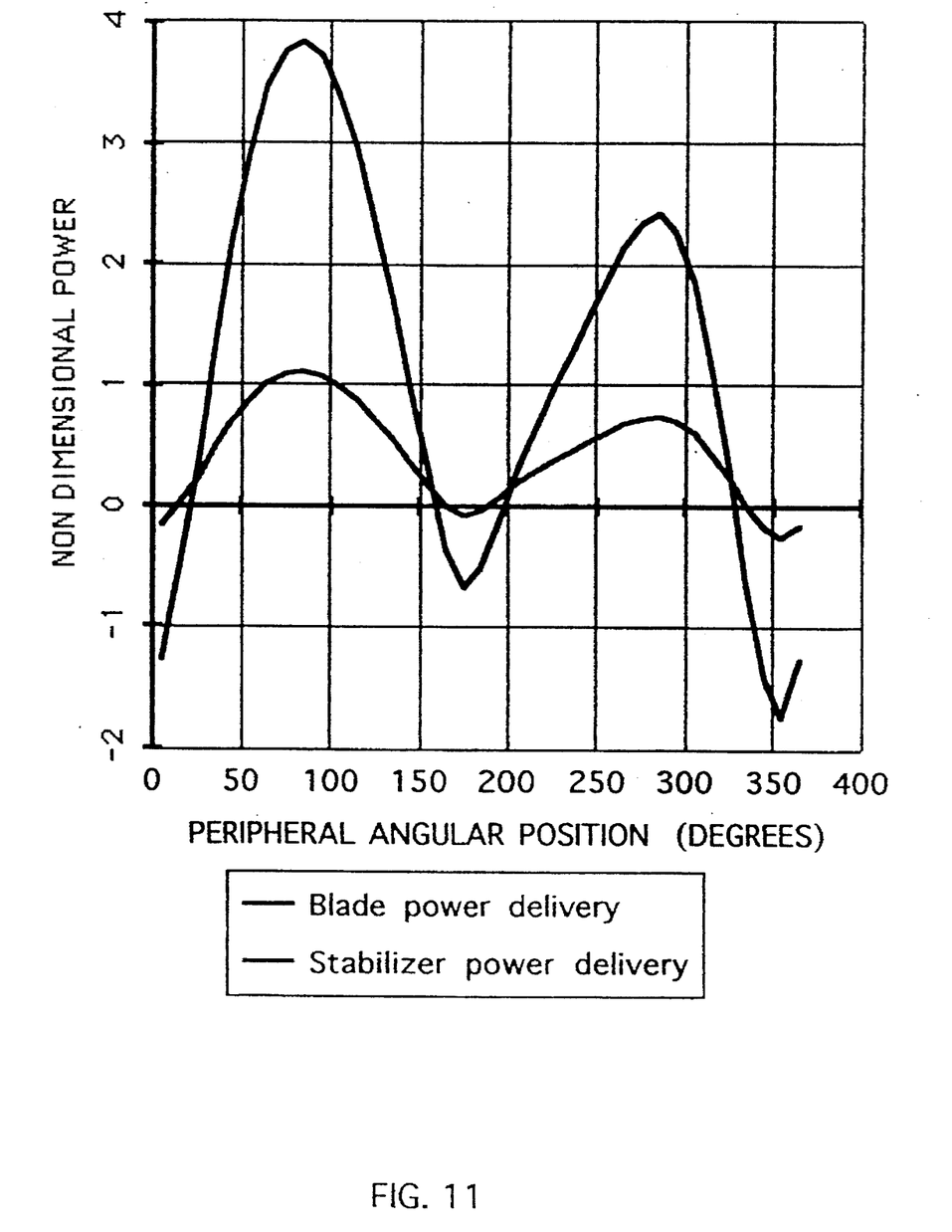
FIG. 11 is a power delivery versus blade peripheral angular position graph.
Figure 12:
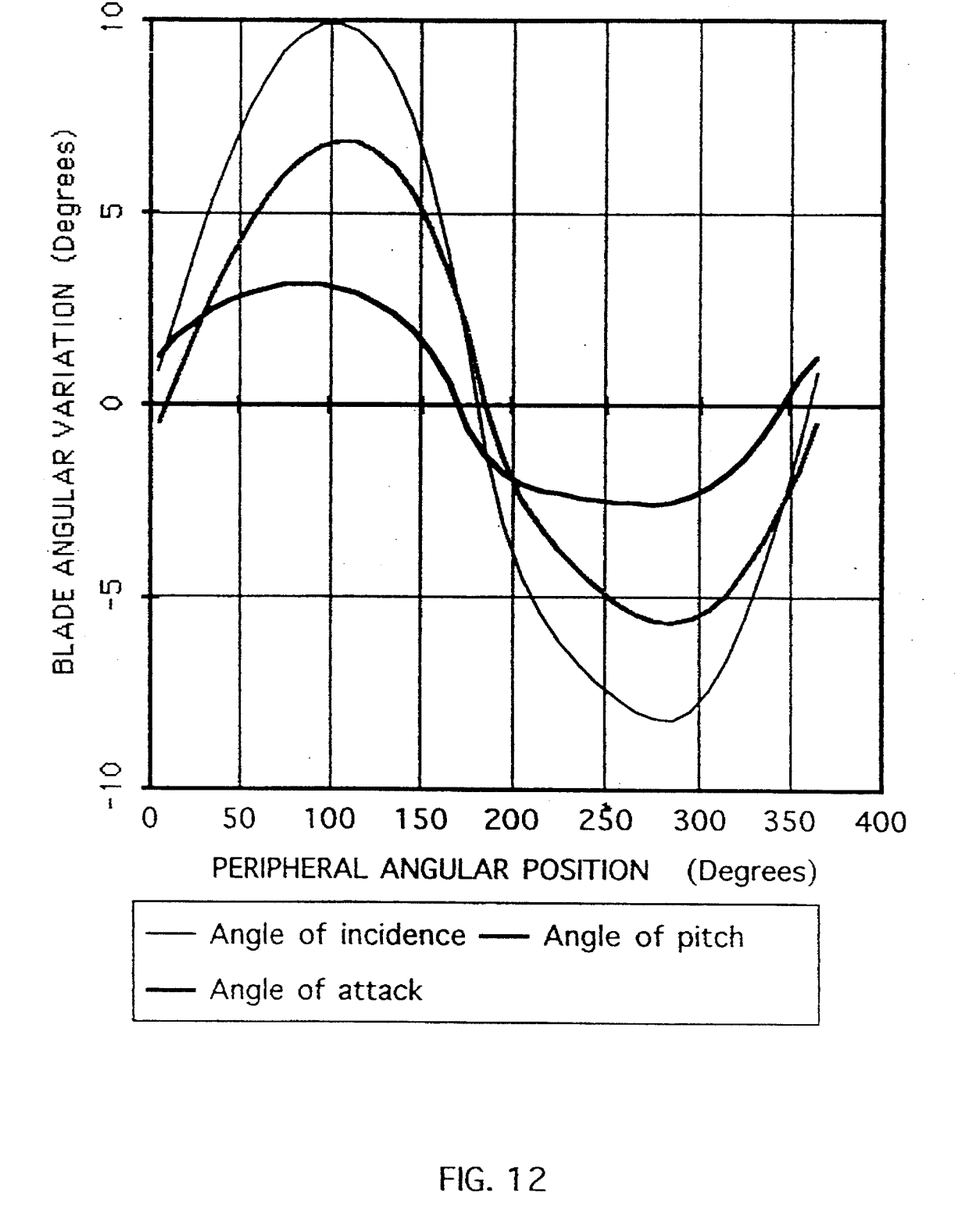
FIG. 12 is a blade angular variation versus peripheral angular position for the optimum celerity graph.
Figure 13:
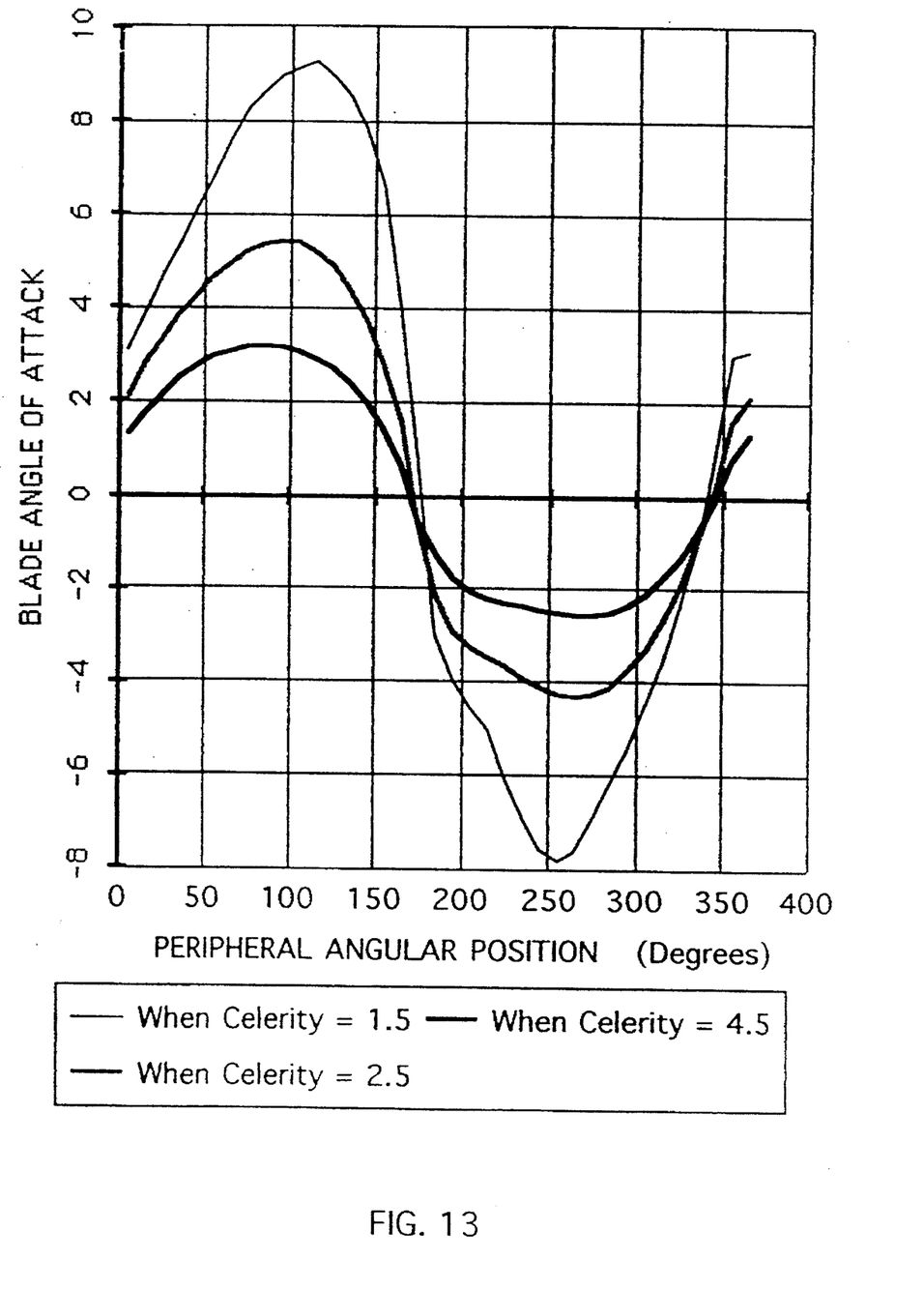
FIG. 13 is a blade angle of attack versus peripheral angular position for different celerities graph.

The equilibrium condition when the blade is in the frontal semicircumference, according to FIG. 9 is expressed by:

$$M_B = M_S \quad \{1\}$$

or $$L_B (E_B \cos \alpha_B) = L_S (E_S \cos \alpha_S) \quad \{2\}$$

where:
$L_B$=Blade lift force=½ ρ $C_{LB}$ $A_B$ $V_B^2$
$E_B$=Distance from the blade center of pressure [7] to the blade pivot axis.
$\alpha_B$=Blade angle of attack
LS=Stabilizer lift force=½ ρ $C_{LS}$ $A_S$ $V_S$
$E_S$=Distance from the stabilizer center of pressure [8] to the stabilizer pivot axis.
$\alpha_S$=Stabilizer angle of attack Thus, the expression {2} can be written as:

$$\tfrac{1}{2} \rho\, C_{LB}\, A_B\, V_B^2\, E_B \cos \alpha_B = \tfrac{1}{2} \rho\, C_{LS}\, A_S\, V_S^2\, E_S \cos \alpha_S \quad \{3\}$$

where:
ρ=air density
$C_{LB}$=Blade lift coefficient
$A_B$=Blade area
$V_B$=Blade relative wind speed
$C_{LS}$=Stabilizer lift coefficient
$A_S$=Stabilizer area
$V_S$=Stabilizer relative wind speed Simplifying the expression {3}:

$$C_{LS} (\cos \alpha_B / \cos \alpha_S) = (C_{LS}\, A_S\, V_S^2\, E_S)/(A_B\, V_B^2\, E_B) \quad \{4\}$$

Considering that the maximum useful angle of attack of an air-foil is the "critical angle" or "stall angle" which is around 16°, depending on the airfoil selected, and that the difference ($\alpha_S - \alpha_B$) is typically smaller than 9°; then from the expression {4}:

$$(\cos \alpha_B / \cos \alpha_S) = 1 \quad \{5\}$$

From the aerodynamic theory of wing sections, it can be seen that the lift coefficient vs angle of attack characteristic curve for almost all airfoils, consist of a straight line, up to 12° of angle of attack, therefore the blade lift coefficient $C_{LB}$ and the stabilizer lift coefficient $C_{LS}$ can be expressed as:

$$C_{LS} = K_B \alpha_B \text{ and } C_{LS} = K_S \alpha_S \quad \{6\}$$

where:
KB and KS are constant factors which depend on the shape of the airfoils selected and which include any other suitable correction factors.

From the analysis of FIG. 9 it can be seen that:

$$\alpha_S = \alpha_B + (\Phi_S - \Phi_B) \text{ or } \alpha_B = \alpha_S - (\Phi_S - \Phi_B) \quad \{7\}$$

where:
$\Phi_B$=Blade relative wind incidence angle
$\Phi_S$=Stabilizer relative wind incidence angle Introducing {5}, {6} and {7} into {4}:

$$K_B \alpha_B = [K_S(\alpha_B + (\phi_S - \phi_B))A_S V_S^2 E_S]/[A_B V_B^2 E_B] \quad \{8\}$$

or:

$$\alpha_B = \frac{K_S/K_B \cdot A_S/A_B \cdot V_S^2/V_B^2 \cdot E_S/E_B \cdot (\phi_S - \phi_B)}{1 - [K_S/K_B \cdot A_S/A_B \cdot V_S^2/V_B^2 \cdot E_S/E_B]}$$

and since: $V_{tB} = \lambda V_0$ and $V_{tS} = \lambda V_0 R_S/R_B$
from the trigonometrical analysis of FIG. 9:
$V_B = V_0 [\lambda^2 + (1-a_1)^2 - 2\lambda(1-a_1)\cos(180°-\theta)]^{1/2}$
$V_S = V_0 [\lambda^2 (R_S/R_B)^2 + (1-a_1)^2 - 2\lambda R_S/R_B (1-a_1) \cos(180°\theta)]^{1/2}$ $\Phi_B$=Arc sin [($V_1/V_B$) sin (180-θ)]
$\Phi_S$=Arc sin [($V_1/V_S$) sin (180-θ)]

Where the expression {8} indicates the instantaneous value of the blade angle of attack at any pheripherical angular position between 0° and 180°, at any celerity or tip speed ratio $\lambda = V_{tB}/V_0$, for a given set of parameters $K_S/K_B$, $A_S/A_B$, $E_S/E_B$ and $R_S/R_B$. The same equation applies for the rear semicircumference by using the corresponding values of (1-$a_2$) and cos(360°-θ).

The instantaneous value of the blade pitch angle β is then:

$$\beta = \Phi_B - \alpha_B \text{ or } \beta = \Phi_S - \alpha_S \quad \{9\}$$

The instantaneous power delivery of one blade and stabilizer assembly is given by:

$$P_{BS} = F_{tB} V_0 \lambda + F_{tS} R_S/R_B V_0 \lambda$$

From the analysis of FIG. 9 it can be written as:

$$P_{BS} = [(L_B \sin \Phi_B - D_B \cos \Phi_B)V_0\lambda] + [(L_S \sin \Phi_S - D_S \cos \Phi_S) R_S/R_B V_0\lambda]$$

where:
$D_B$=Blade drag force
$D_S$=Stabilizer drag force
$D_B$=½ ρ $C_{DB}$ $A_B$ $V_B^2$
$D_S$=½ ρ $C_{DS}$ $A_S$ $V_S^2$
and where:
$C_{DB}$ and $C_{DS}$ are the drag coefficients which include the profile drag, the induced drag and a proportional distributed rotor supporting structure parasite drag.

By adequately integrating the instantaneous values of $P_{BS}$ a mean value can be obtained, which multiplied by the number of blades, will yield the total power delivery of the invention.

With the preceding theoretical analysis, it is possible to design the claimed invention cross-wind-axis wind turbine, for any size, for any wind speed, for any power delivery, for a high starting torque or for a high rotational speed, by adequately selecting the corresponding parameters.

Some refinements could be made to the above formulations after confrontation with a prototype experimental data.

While the above description contains many specifities, these should not be construed as limitations on the scope of the invention. Many other variations are possible, for example the blades could be tapered, could have a dihedral angle, or could have a swept back or swept forward angle; the working fluid could be other than the wind and the rotor axis could as well be installed horizontally or at any angle Accordingly, the scope of the invention should be determined not by the embodiments illustrated, but by the appended claims and their legal equivalents.

I claim:

1. A cross-wind axis wind turbine, comprising a cross-wind-axis rotor structure having multiple orientable blades around its periphery, said blades mounted parallel to an axis of the rotor structure and pivotally fastened to the rotor structure, each blade being operatively coupled with a respective orientable stabilizer, said stabilizer being pivotally fastened to the rotor structure on a same rotor radial line as the blade, said blade and said stabilizer being operatively coupled to pivot simultaneously and essentially parallel to each other around respective pivot axes to a pitch angle, wherein opposing pitching moments created by aerodynamic lift forces over said blade and over said stabilizer equilibrate each other.

2. A cross-wind-axis wind turbine according to claim 1, wherein the blade pivot axis crosses the blade mean aerodynamic chord, at a point between a leading edge and an aerodynamic center of pressure, of the blade.

3. A cross-wind-axis wind turbine according to claim 1, wherein the stabilizer pivot axis crosses the stabilizer mean aerodynamic chord, at a point between a trailing edge and an aerodynamic center of pressure, of the stabilizer.

4. A cross-wind-axis wind turbine according to claim 1, wherein said stabilizer is pivotally fastened to the rotor structure at a radius which is not less than 50% of a radius of the rotor structure.

5. A cross-wind-axis wind turbine according to claim 1, wherein the aerodynamic lift forces are optimum to induce a necessary torque to spin up the rotor.

6. A cross-wind-axis wind turbine according to claim 1, wherein each blade is operatively coupled with the respective stabilizer by means for transferring angular displacement.

7. A cross-wind-axis wind turbine according to claim 6, wherein, the weight distribution of an interconnected assembly comprising the blade, the stabilizer and the means for transferring angular displacement, is dynamically balanced to avoid an unfavorable displacement due to centrifugal force.

* * * * *